(12) United States Patent
Osann, Jr.

(10) Patent No.: US 6,498,361 B1
(45) Date of Patent: Dec. 24, 2002

(54) DESIGN INFORMATION MEMORY FOR CONFIGURABLE INTEGRATED CIRCUITS

(75) Inventor: Robert Osann, Jr., Los Altos, CA (US)

(73) Assignee: Lightspeed Semiconductor Corporation, Sunnyvale, CA (US)

( * ) Notice: Subject to any disclaimer, the term of this patent is extended or adjusted under 35 U.S.C. 154(b) by 0 days.

(21) Appl. No.: 09/140,087

(22) Filed: Aug. 26, 1998

(51) Int. Cl.⁷ .................. H01L 33/00; H01L 29/76; H01L 29/78
(52) U.S. Cl. .................. 257/202; 257/401; 438/4; 438/14; 438/15
(58) Field of Search .................. 257/202, 401; 438/4, 14, 15, 462, 975

(56) References Cited

U.S. PATENT DOCUMENTS

| | | | | |
|---|---|---|---|---|
| 4,446,475 A | * | 5/1984 | Gercekci et al. | |
| 5,408,131 A | * | 4/1995 | Khatri et al. | |
| 5,452,297 A | * | 9/1995 | Hiller et al. | |
| 5,732,207 A | * | 3/1998 | Allen et al. | |
| 5,787,174 A | * | 7/1998 | Tuttle | |
| 5,894,422 A | * | 4/1999 | Chasek | |

FOREIGN PATENT DOCUMENTS

EP 0360164 A2 * 3/1990

* cited by examiner

Primary Examiner—Stephen D. Meier
(74) Attorney, Agent, or Firm—Fliesler Dubb Meyer & Lovejoy LLP

(57) ABSTRACT

On a wafer that includes multiple distinct designs in each die region, a memory is included in each die region. The memory stores information specific to the design implemented in the same die region. Such stored information may include a circuit design identifier or a proprietary technology identifier. Such identifiers minimize IC confusion and aid in tracking usage of proprietary technology.

20 Claims, 3 Drawing Sheets

DESIGN INFORMATION MEMORY FOR CONFIGURABLE INTEGRATED CIRCUITS

FIELD OF INVENTION

The present invention relates to configurable integrated circuits, such as ASICs and gate arrays, and particularly, the invention relates to electronic identification of configurable integrated circuit designs.

BACKGROUND

Configurable integrated circuits are integrated circuits (ICs) that are customized and fabricated to meet the specific needs of a particular user, typically an IC designer. Configurable ICs include application-specific integrated circuits (ASICs), such as gate arrays which are partially customizable, and standard cells which are completely customizable by a user of such circuits.

In particular, gate arrays are popular among IC designers as a generally economical way of creating unique ICs for use in their electronic designs. Gate arrays are generally composed of a predefined matrix (or array) of function blocks, which can be formed into a specific, unique circuit by interconnecting the function blocks. Because gate arrays are already predesigned and often prefabricated up to the point where a user can customize them, gate arrays are often used as low-cost prototypes in the electronics design process.

The fabrication of configurable ICs is usually done on a silicon wafer. The wafer is divided into multiple die, where each die is eventually separated from the rest of the wafer to become an individual IC. Once the die have been separated, the die are tested and packaged.

Typically a single IC design is placed on a wafer. In other words, the same design is placed in each die on the wafer. Placing different IC designs into the distinct die on the wafer is generally undesirable because the die are not always easily visually distinguishable. IC designs become easily confused and mixed together during the testing and packaging process.

Frequently, an IC designer using a configurable IC will only require very few configurable ICs to be manufactured and customized for their use, especially when the IC is to be a prototype. It is not unheard of that IC designers require only one prototype to be manufactured. IC designers often do not need (or want to pay for) the multiple ICs that are formed as a result of placing the designer's design into each die on the wafer.

If the IC designer desires only one custom IC, however, as a prototype or for another low volume production reason, the manufacturer is faced with two choices: (1) either place only one design on a wafer, or (2) place multiple distinct designs on a single wafer. The first option, placing only one design on a wafer, is expensive and wasteful for the manufacturer. Further, if the configurable IC is sold based on charging the IC designer low fees for prototypes, it becomes strongly desirable to place multiple designs on a wafer so that the cost of producing the prototypes for the new design may be shared with other designs.

Still, if the manufacturer cannot identify which design is included on which die, placing multiple designs on a wafer will become burdensome and drive costs upward. Accurate testing and packaging may not occur or the IC designer may not receive the correct design. Hence, most manufacturers that are involved in low volume production of particular designs try to avoid placing multiple designs on a single wafer.

SUMMARY OF THE INVENTION

To minimize the burdens of fabricating multiple distinct IC designs on a single wafer, a small memory is included in each die region. In one embodiment, the memory is a mask-programmed ROM. The memory stores information specific to the design included in the particular die region. For instance, the. memory may include a circuit design identifier in one embodiment. In another embodiment, the memory may include a customer identifier. Once the fabrication process is complete and the die separated from the wafer, the memory can be electronically read to identify the circuit design included. In this manner, design misidentification is minimized. The design identifier can further be used to select test patterns for use in testing the IC.

In still other embodiments of the invention, proprietary technology identifiers are stored in the memory. These proprietary technology identifiers are useful for identifying any proprietary technology that may be incorporated in the circuit design. Such information is particularly useful to owners/licensors of the proprietary technology in tracking where and by whom the proprietary technology is being utilized.

BRIEF DESCRIPTION OF THE DRAWINGS

The invention will be described with respect to particular embodiments thereof, and reference will be made to the drawings, which are not necessarily drawn to scale, and in which.

DETAILED DESCRIPTION

In order to avoid confusion as to the identity of one of the designs on a wafer that includes multiple designs, a small memory is included in each die (each configurable IC). The memory is programmed by the manufacturer and can be read back after manufacturing/customization is complete. The information stored in this memory can contain an identity indicator for a particular customer's design, or can contain information which relates to the contents of a particular design, such as a list of what proprietary technology (e.g., patents, trade secrets) has been included in the design. Further details of the invention will be made with reference to the figures.

Figure 1:
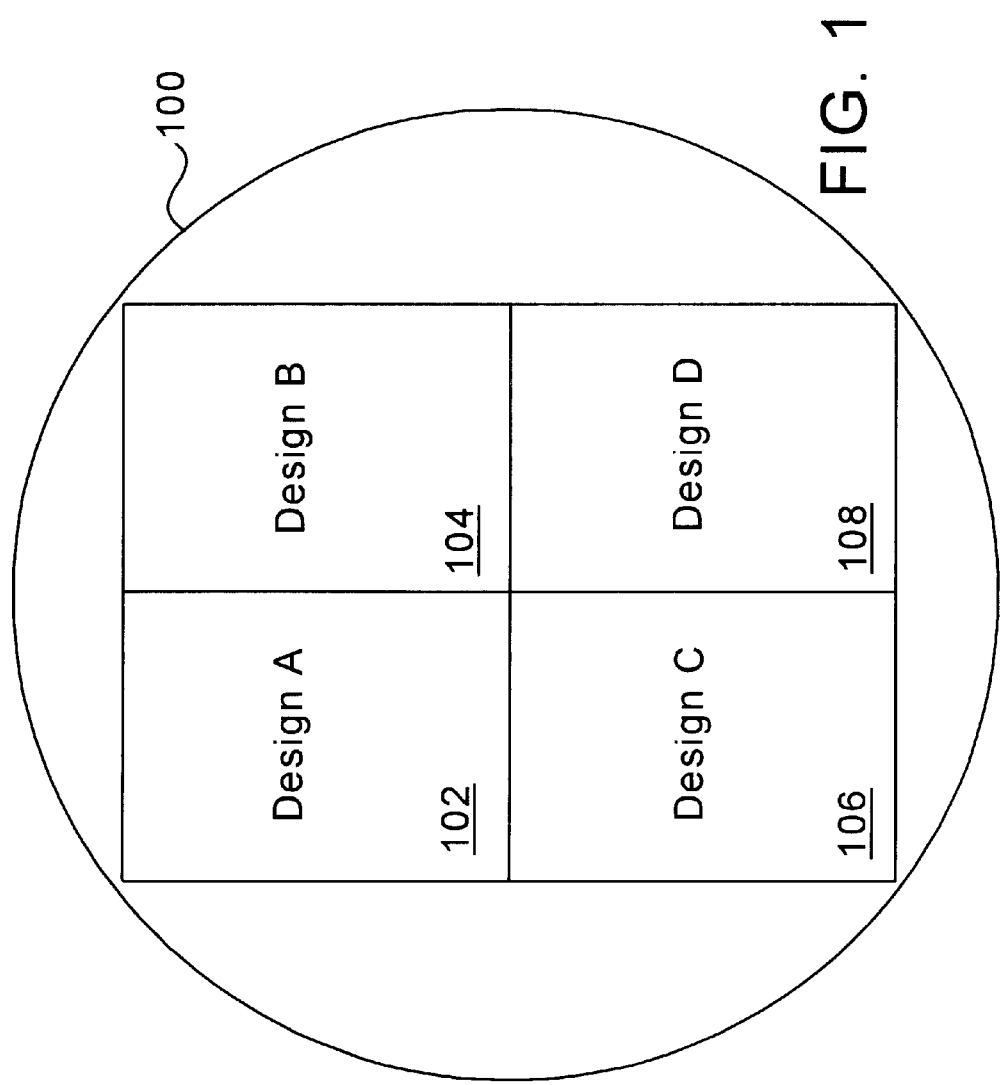
FIG. 1 is a generalized block diagram of a wafer containing multiple die, where each die includes a distinct design.

FIG. 1 illustrates a wafer 100. The wafer 100 has been divided into four distinct die regions, 102, 104, 106, and 108. More or fewer die can be included on a single wafer than shown as will be understood by those of skill in the art. Four die regions have been chosen for illustration purposes only.

Each die shown on wafer 100 has been customized to include a different IC design. Design A has been fabricated in die 102. Design B has been fabricated in die 104. Design C has been fabricated in die 106. Design D has been fabricated in die 108. Although four different designs are shown on wafer 100, it is to be understood that one design could be implemented in multiple die. For instance, it is well within the bounds of the invention that Design A be incorporated into both die regions 102 and 104, while Design C could be incorporated into die regions 106 and 108. Separate designs in each die has been chosen for use as illustration only.

Figure 2:
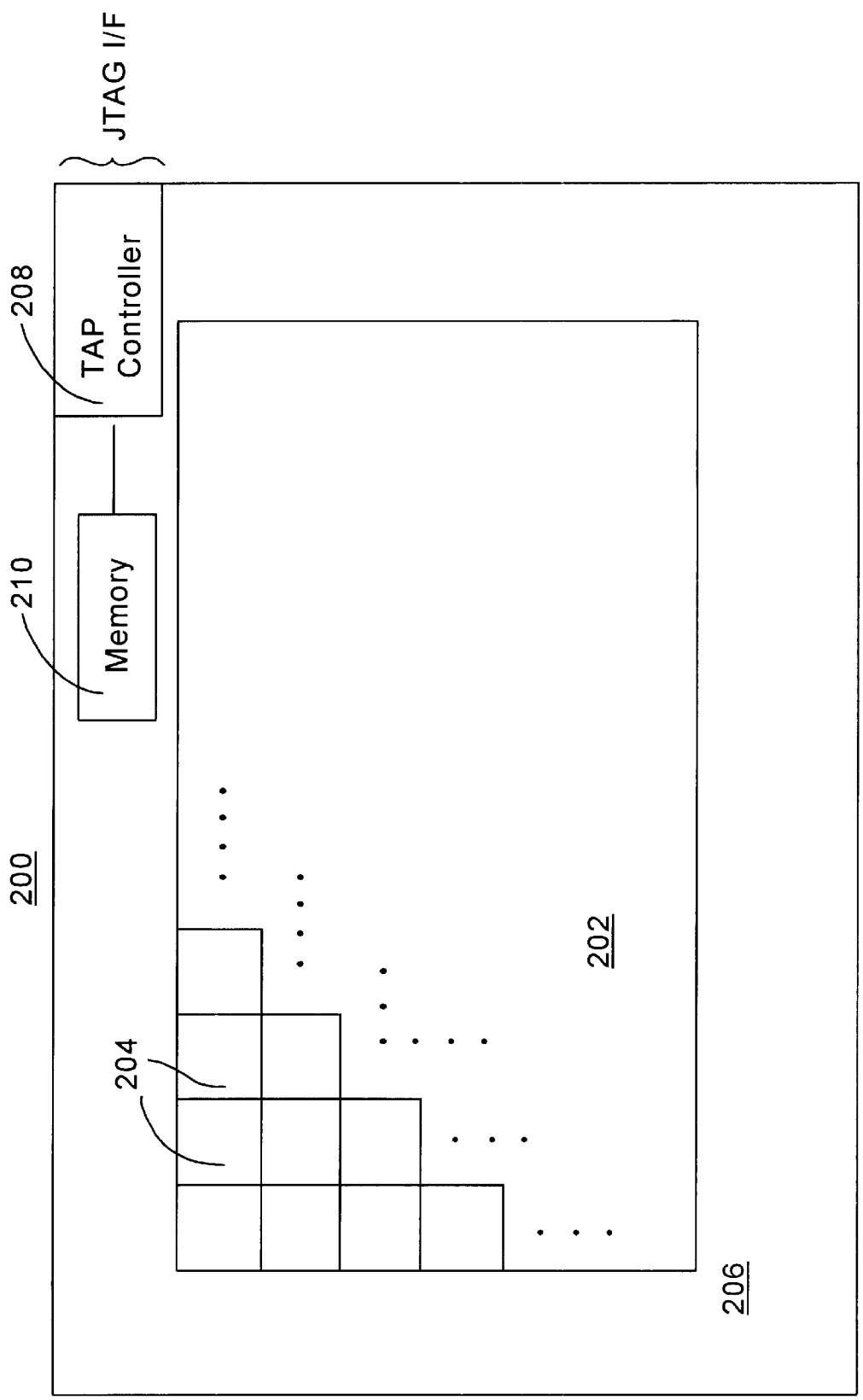
FIG. 2 is a generalized block diagram of one embodiment of a configurable IC in accordance with the invention.

In accordance with one embodiment of the invention, each of the Designs A, B, C, and D, may be implemented using a predesigned and/or prefabricated gate array such as gate array 200 shown in FIG. 2. Gate array 200 is composed of an array 202 of function blocks 204, where each function block is substantially identical to the other function blocks in array 202. Although the function blocks in array 202 are shown as being substantially adjacent to one another, these function blocks 204 can be separated by a channel region. Array 202 is configured in accordance with a specific IC designer's design by forming interconnections between the function blocks 204.

Gate array 200 further includes a periphery area 206, which generally includes circuitry used to access and utilize array 202, including circuitry that is often used for testing array 202. In particular, such circuitry includes TAP controller 208, which generally includes a serial interface such as a JTAG interface, which is well known in the art. TAP controller 208 is often used for running test patterns through array 202 to insure that the circuitry has been appropriately connected. The test patterns utilized are unique to the custom design, which is implemented on the IC.

Finally, in accordance with the invention, a memory 210 is included in periphery region 206. If the function blocks 204 are designed to be customizable to implement a memory, some embodiments may include the memory in the array region. Memory 210 is coupled to TAP controller 208 in one embodiment of the invention. In other embodiments, the memory may be directly accessible (i.e., without having to go through an intermediary such as the TAP controller). Memory 210 is, in one embodiment of the invention, a mask programmed ROM, so that the contents of the memory would be unalterable once programmed. In other embodiments of the invention, however, memory 210 could be electrically programmable or otherwise alterable.

Once memory 210 is programmed, reading is typically accomplished through the JTAG (or other serial) test port as will be understood by those with skill in the art. When the TAP controller 208 receives a command through the JTAG interface to read memory 210, memory data is shifted out from memory 210 through the JTAG interface. In this manner, once the die are "diced" (separated from the wafer), electronic means can be used to read identifying information from the die.

The information stored on the memory may be read back by the manufacturer, the IC designer, or by others. In some embodiments, however, a keying mechanism may be used either to encrypt the information or to encode or key the mechanism that is used to access the information. In those embodiments, access to the information stored on the memory may be limited to particular persons.

Figure 3:
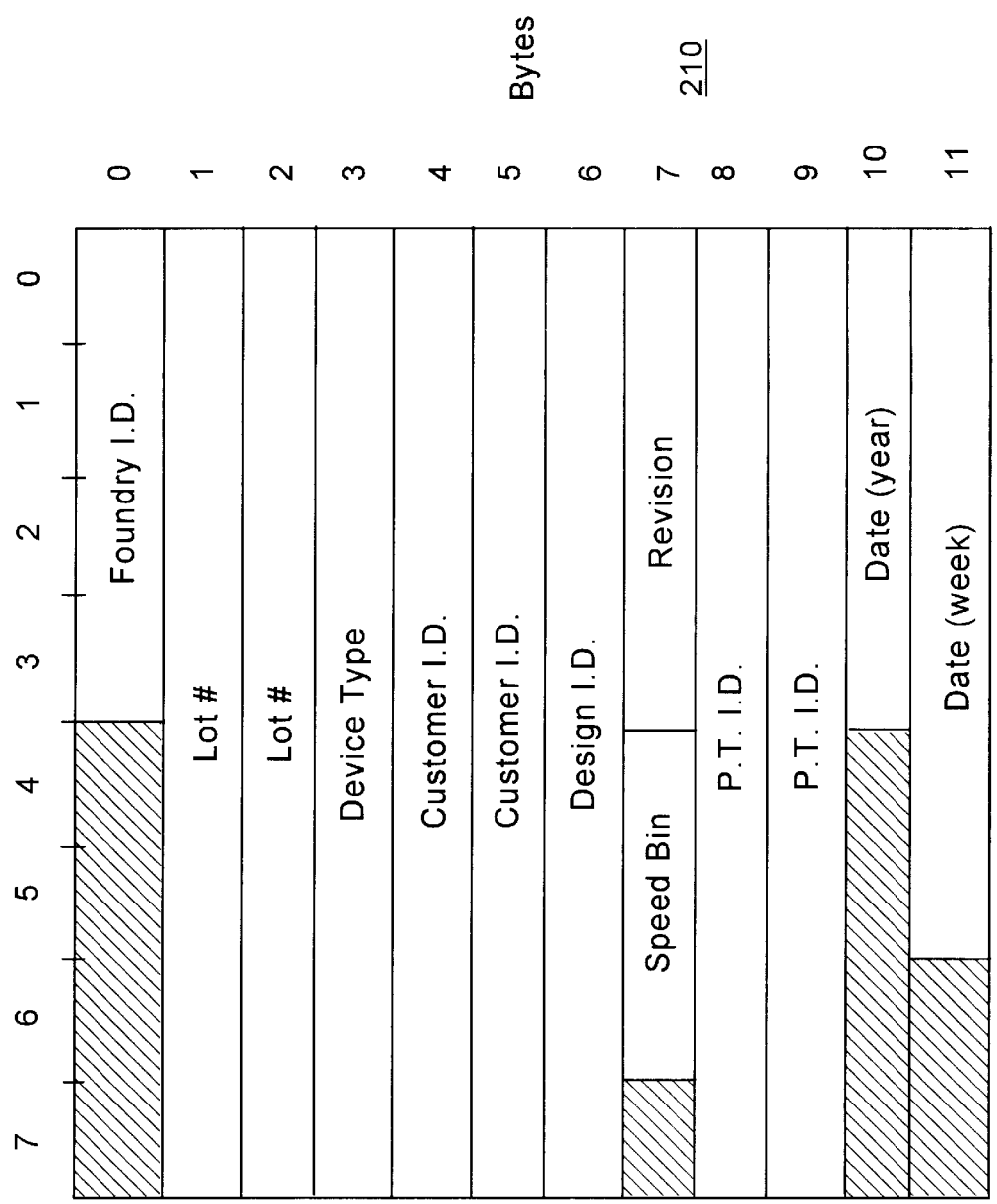
FIG. 3 is a block diagram representative of one embodiment of a memory in accordance with the invention.

FIG. 3 shows an example of one embodiment of a memory 210 in accordance with the invention. The memory 210 stores various identifying information regarding the IC. As shown in FIG. 3, the first four bits of byte 0 are used to store a foundry identification. Bytes 1 and 2 store the lot number identifier. Byte 3 stores a device type, such as a part number identifier. Bytes 4 and 5 identify the customer (IC designer) whose design is implemented on the particular die. Byte 6 includes a design identifier, identifying the particular design that is implemented on the die. The lower four bits of byte 7 are used to identify the design revision. Bits 4–6 of byte 7 are used to identify the speed bin, for instance if wafers have been previously sorted into "bins" or categories according to performance. Bytes 8 and 9 include proprietary technology identifiers, used for identifying any proprietary technology (P.T.) that is included in the design. Bytes 10 and 11 are used to identify the date when the die was fabricated. Of course, the information shown as stored in memory 210 is illustrative only. In accordance with the invention, any information relating to the specific circuit design itself is appropriate. As shown in FIG. 3, the memory need not be large, and may in some embodiments only be a few hundred bits in size.

Referring to bytes 4–6, including a customer identifier and a design identifier allows the manufacturer/customizer of the IC to precisely identify electronically the design that has been incorporated on the die. In addition to minimizing confusion among many die with differing designs, such information can be used to enable the automatic selection of test patterns to be applied to test the die.

Referring to bytes 8 and 9 of FIG. 3, designs will often incorporate proprietary technology, such as that protected by patents, trade secrets, or other intellectual property, owned or licensed by the IC designer whose design is being implemented on the IC. For instance, certain predefined circuits, sometimes called "cores" or IP (intellectual property) may be included in the IC design. Oftentimes, these cores will be legally used only by way of licensing them from another entity.

Many proprietary technology owners, however, are concerned that their circuits (cores), may be included on an IC where the IC designer has not executed a proper license agreement. Verifying if such circuits are incorporated in an IC is an extremely difficult process with modern ASICs, where the circuit density and size render the circuit design extremely difficult to detect and analyze.

Use of the PT identification field in memory 210 will serve to help protect a proprietary technology owner's rights. First, licensees will request that such fields be programmed when they have executed the proper license agreement. In other embodiments, the software design system, which actually creates the netlist and layout for producing the particular custom IC design, will detect the presence of particular predefined proprietary circuits, and then write appropriate identifiers to be programmed into the memory 210. Later, after a device has been manufactured, and incorporated into some product, the IC, through its memory, can be queried to determine what proprietary technology has been specifically included.

Albeit that memories are sometimes used in conventional configurable ICs, such memories are typically used for tracking device theft or field failure analysis. For instance, in tracking device theft, a memory is programmed with production information. As the wafer goes through processing, the memory is programmed to indicate how far through the process the device has gone. Thus, if the device is stolen mid-process, when the ICs are recovered, the security problems in the process can be isolated. For field failure analysis, a memory is programmed with the wafer and lot the die came from so as to isolate those that may have been the product of a faulty fabrication process.

Still, such conventional devices have not been used to store and identify information about the designs themselves on a particular die or wafer. The ability to read design information electronically during wafer sort testing or during package testing is valuable and significantly reduces the risk of including multiple designs on a wafer. Moreover, memories have not been utilized for tracking the proprietary technology used in such configurable ICs.

Hence, a system and method has been disclosed that allows the identification of designs and elements of designs.

It should be understood that the particular embodiments described above are only illustrative of the principles of the present invention, and various modifications could be made by those skilled in the art without departing from the scope and spirit of the invention. Thus, the scope of the present invention is limited only by the claims that follow.

What is claimed is:

1. A method for forming integrated circuits on a wafer that includes a plurality of die regions, comprising the steps of:
    forming a respective circuit design in each die region in said plurality of die regions, wherein at least two of said circuit designs are distinct from one another;
    forming a memory in each die region in said plurality of die regions, wherein each respective memory is accessible during said method of forming said integrated circuits and subsequent to dicing of said wafer;
    programming into said memory in each die region in said plurality of die regions design information for the respective circuit design in the respective die region; and,
    dicing said wafer into separate said die regions, subsequent to said step of programming.

2. The method of claim 1, wherein said design information includes a circuit design identifier.

3. The method of claim 2, further comprising the steps of:
    dicing said wafer into separate said die regions;
    testing one of said die regions, including reading said circuit design identifier from said memory and selecting test patterns that correspond to said design information.

4. The method of claim 1, wherein said design information includes a proprietary technology identifier.

5. The method of claim 1, wherein said step of forming said memory includes the step of mask programming said memory with said design information.

6. A method for forming at least two distinct integrated circuits on a wafer that includes a plurality of die regions, comprising the steps of:
    forming a circuit design in each die region in said plurality of die regions, wherein at least two of said circuit designs are distinct;
    forming a memory in each die region in said plurality of die regions, wherein each respective memory is accessible during said method of forming said integrated circuits and subsequent to dicing of said wafer;
    programming into said memory in each die region in said plurality of die regions a circuit design identifier; and,
    dicing said wafer into separate said die regions, subsequent to said step of programming.

7. A method for forming an integrated circuit, comprising the steps of:
    fabricating an IC design on a die in a wafer;
    forming a memory in said die, wherein said memory is accessible during said method of forming said integrated circuit and subsequent to dicing said die from said wafer;
    programming into said memory in said die proprietary technology information; and,
    dicing said die region from said wafer, subsequent to said step of programming.

8. A method for forming customized integrated circuits, comprising the steps of:
    providing a wafer having a plurality of die regions, wherein each of said die regions includes a prefabricated gate array device, said gate array device including a memory, wherein each respective memory is accessible during said method of forming said customized integrated circuits and subsequent to dicing of said wafer;
    customizing each prefabricated gate array device to include a specified respective design;
    programming each memory to include design information specific to said specified respective design; and
    dicing said wafer into separate said die regions, subsequent to said step of programming.

9. The method of claim 8, wherein said design information includes a design identifier.

10. The method of claim 8, wherein said design information includes proprietary technology information.

11. The method of claim 8, wherein said memory is a mask-programmed ROM.

12. A method for forming integrated circuits on a wafer that includes a plurality of die regions, comprising the steps of:
    forming a plurality of integrated circuits, where each respective circuit is included in a respective die region in said plurality of die regions;
    forming a memory, where each respective memory is included in a respective die region in said plurality of die regions, and wherein each respective memory is accessible during said method of forming said integrated circuits and subsequent to dicing of said wafer;
    programming into said memory in each die region in said plurality of die regions design information for the respective circuit design in the respective die region; and
    dicing said wafer into separate said die regions.

13. The method of claim 12, wherein said design information includes a circuit design identifier.

14. The method of claim 13, further comprising the steps of:
    dicing said wafer into separate said die regions;
    testing one of said die regions, including reading said circuit design identifier from said memory and selecting a test pattern that corresponds to said design information.

15. The method of claim 12, wherein said design information includes a proprietary technology identifier.

16. The method of claim 12, wherein said step of forming said memory includes the step of mask programming said memory with said design information.

17. A method for forming at least two distinct integrated circuits on a wafer that includes a plurality of die regions, comprising the steps of:
    forming a circuit design in each die region in said plurality of die regions, wherein at least two of said circuit designs are distinct;
    forming a mask programmable Read Only Memory (ROM) in each die region in said plurality of die regions, wherein each respective ROM is accessible during said method of forming said integrated circuits and subsequent to dicing of said wafer;
    mask programming into said ROM in each die region in said plurality of die regions design information for the respective circuit design in the respective die region; and,
    dicing said wafer into separate said die regions, subsequent to said step of mask programming.

18. The method of claim 17, wherein said design information includes a circuit design identifier.

19. A method for forming at least two distinct integrated circuits on a wafer that includes a plurality of die regions, comprising the steps of:

forming a circuit design in each die region in said plurality of die regions, wherein at least two of said circuit designs are distinct;

mask programming into a mask programmable Read Only Memory (ROM) in each die region in said plurality of die regions design information for the respective circuit design in the respective die region;

dicing said wafer into separate said die regions, subsequent to said step of mask programming; and, testing one of said die regions, including reading said circuit design information from said ROM and selecting test patterns that correspond to said design information.

20. The method of claim 19, wherein said design information includes a proprietary technology identifier.

* * * * *